United States Patent [19]

Kelly

[11] Patent Number: 5,707,544

[45] Date of Patent: Jan. 13, 1998

[54] CHROMOPHORE-CONTAINING PHOTO CROSS-LINKABLE LIQUID CRYSTALS

[75] Inventor: Stephen Kelly, Beverley, England

[73] Assignee: Rolic AG, Basel, Switzerland

[21] Appl. No.: 650,241

[22] Filed: May 20, 1996

[30] Foreign Application Priority Data

Jun. 7, 1995 [CH] Switzerland .................. 1663/95

[51] Int. Cl.[6] .................... C09K 19/52; C09K 19/32; C09K 19/20; C09K 19/00
[52] U.S. Cl. .................. 252/299.01; 252/299.1; 252/299.6; 252/299.61; 252/299.62; 252/299.63; 252/299.64; 252/299.65; 252/299.66; 252/299.67; 252/299.68; 560/60; 560/61; 560/65; 560/76; 544/298; 546/339; 546/342; 568/626; 568/647
[58] Field of Search .............. 252/299.67, 299.01, 252/299.6, 299.68, 299.61, 299.66, 299.63, 299.62, 299.64, 299.65, 299.1; 560/60, 61, 73, 76, 65; 546/339, 342; 549/369, 370; 544/298, 224, 335; 568/626, 647; 534/577

[56] References Cited

U.S. PATENT DOCUMENTS

| | | |
|---|---|---|
| 5,389,285 | 2/1995 | Shannon et al. .............. 252/299.1 |
| 5,567,349 | 10/1996 | Kelly .............................. 252/299.01 |
| 5,578,419 | 11/1996 | Itoh et al. ....................... 430/281.1 |
| 5,593,617 | 1/1997 | Kelly .............................. 252/299.67 |

*Primary Examiner*—C. H. Kelly
*Attorney, Agent, or Firm*—Mark E. Waddell; Bryan Cave LLP

[57] ABSTRACT

The present invention is concerned with chromophore-containing photo cross-linkable liquid crystalline compounds having the formula

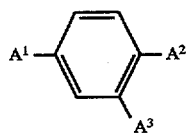

I wherein $A^1$ and $A^2$ each represent a cross-linkable, mesogenic group; and $A^3$ represents a dichroic group.

as well as liquid crystalline mixtures which contain such compounds and their use in the cross-linked state as optical components.

18 Claims, No Drawings

CHROMOPHORE-CONTAINING PHOTO CROSS-LINKABLE LIQUID CRYSTALS

BACKGROUND OF THE INVENTION

1. Field

The present invention is concerned with chromophore-containing photo cross-linkable liquid crystalline compounds, liquid crystalline mixtures containing such compounds, and use of such compounds in the cross-linked state as optical components.

2. Description

Photo cross-linkable liquid crystals, when provided with a suitable amount of a photoinitiator, can be orientated on a substrate or in a cell by suitable orientating layers or in a field. Once oriented, these liquid crystals can be cross-linked by irradiation with light of a dutiable wavelength to produce a structure which remains stable even at high temperatures. Thus, optical components such as wave guides, optical grids and filters, piezoelectric cells, and cells having non-linear optical ("NLO") properties, can be produced. Such optical components can be used, for example, in frequency doubling ("SHG") or in color filters.

Further properties such as birefringence, refractive index, transparency, and the like, must fulfill different requirements depending on the field of use. For example, materials for optical filters should have a strong absorption in a direction perpendicular to the filter surface.

Photo cross-linkable liquid crystals should have good chemical and thermal stability, good solubility in common solvents, and a good stability towards electric fields and electromagnetic radiation. They should possess a suitable mesophase in a temperature range from about 25° C. to about +100° C., especially from about 25° C. to about 80° C. Moreover, they should have a strong absorption in the desired wavelength range for the uses set forth above.

Since liquid crystals are usually used as mixtures of several components, it is important that the components have a good miscibility with one another.

Liquid crystalline mixtures, which are used for frequency doubling or as optical filters having a strong absorption at a particular wavelength, contain dichroic dyes, which for the most part, are themselves not liquid crystalline. Mixtures containing such dyes can be developed based on various principles. For example, dyes can be admixed with the liquid crystals. However, in such situations phase transition temperatures tend to be severely reduced, thus allowing for only very limited amounts of dye to be added. Mother method adds dyes to mixtures of photo cross-linkable liquid crystals. Unfortunately, in this case there is the danger that the non-cross-linked component (dye) relaxes thereby decreasing absorption with time; moreover, the solubility of such dyes in photo cross-linked liquid crystals is usually limited by phase separation and/or aggregate formation.

There is accordingly the need, especially for SHG uses, to produce mixtures which are distinguished not only by a high chromophore concentration, but also by a good orientation stability.

By incorporating chromophores into networks, the subject invention achieves high concentrations of the active additives without phase separation or aggregate formation and without influencing the long-term stability of the photo cross-linked liquid crystals. Moreover, the subject chromophores can orientate in an electric field perpendicular to the optical axis of the prepolymerized polymers leading to high SHG efficiency.

SUMMARY OF THE INVENTION

The present invention provides a compound of the formula

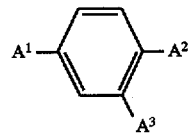

I wherein $A^1$ and $A^2$ each independently is a cross-linkable, mesogenic group; and $A^3$ is a dichroic group.

DETAILED DESCRIPTION OF THE INVENTION

The invention will now be described in terms of its preferred embodiments. These embodiments are set forth to aid in understanding the invention, but are not to be construed as limiting.

The present invention provides compounds which are suitable in an outstanding manner as single components or as components of such liquid crystal mixtures. These compounds have the formula

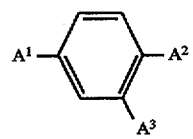

I wherein $A^1$ and $A^2$ each represent a cross-linkable, mesogenic group; and $A^3$ represents a dichroic group.

The term "cross-linkable" as used herein has the significance which is generally recognized in the art. Cross-linkable groups are functional groups for the preparation of networks. For example, cross-linkable groups include polymerizable groups, such as acrylate and the like, as well as dimerizable groups, such as cinnamic acid and its derivatives. The scope of the phrase "cross-linkable group" is readily apparent to the skilled artisan having read the present specification.

The meaning of the term "mesogenic group" is known to persons skilled in the art. For example, mesogenic groups are described in Fluessigkristalle in Tabellen, Deutscher Verlag fuer Grundstoffindustrie Leipzig, 1984, volume II. The mesogenic cross-linkable groups A1 and A2 of the present invention can be different or the same. For known mesogenic groups to be suitable for the above purpose, they should be provided terminally with a polymerizable residue. The term "polymerizable" has its conventional meaning in that a number of molecules can react in a chain reaction to form an oligomer or a polymer."

The term "dichroic group" as presently used is readily identifiable to persons skilled in the art. Such dichroic groups should have the property of absorbing one of two plane-polarized components of transmitted light more strongly than the other, or exhibiting different colors by reflected or transmitted light.

Since the compounds of formula I in accordance with the invention or their mixtures often have a mesophase, they can be orientated by the application of an electric or magnetic field prior to the cross-linking. The phrase "often have a mesophase" does not mean that a particular compound (without mesophase) will not have a positive impact on a LC mixture. Rather, a compound lacking a mesophase will not induce a mesophase in a non-liquid crystalline mixture. A uniform layer can be produced in this manner. Preferably, the mesogenic groups $A^1$ and $A^2$ each signify group of the formula

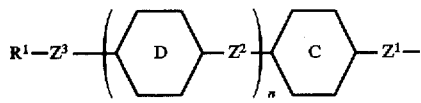
II wherein
rings C and D each independently signify 1,4-phenylene, which is optionally substituted with halogen, methyl and/or cyano, or pyridine-2,5-diyl, pyrimidine-2,5-diyl, trans-1,4-cyclohexylene or trans-1,3-dioxane-2,5-diyl;

$Z^1$ signifies —$CH_2CH_2$—, —$CH_2O$—, —COO—, —OOC—, —$(CH_2)_4$— or —$(CH_2)_3O$—;

$Z^2$ signifies a single bond; —$CH_2CH_2$—, 13 $CH_2O$—, —$OCH_2$—, —COO—, —OOC—, —$(CH_2)_4$—, —$O(CH_2)_3$— or —$(CH_2)_3O$—;

$Z^3$ signifies —$(CY_2)_m$—, —$O(CY_2)_m$—, —$(CY_2)_mO$—, —$(CY_2)_mCOO$—, —$(CY_2)_mOOC$—, —$(Si[(CH_3)_2]O)_m$—, —$OCH_2(Si[(CH_3)_2]O)_m$—, $Si[(CH_3)_2]CH_2O$— or —$NHCH_2(Si[(CH_3)_2]O)_m$—$Si[(CH_3)_2]CH_2NH$—;

Y signifies hydrogen or fluorine;

n signifies 0 or 1;

m signifies a whole number of 1 to 16; and $R^1$ signifies a cross-linkable group such as ethylene, acrylate, methacrylate, 2-chloroacrylate, 2-phenylacrylate, acryloylphenylene, acrylamide, methacrylamide, 2-chloroacrylamide, 2-phenylacrylamide, epoxy, itaconic acid ester, vinyl ether, vinyl ester, styrene derivative, siloxane, ethyleneimine derivative, maleic acid derivative, fumaric acid derivative or a cinnamic acid derivative, which is optionally substituted with methyl, methoxy, cyano and/or halogen.

Compounds of formula I in which the two mesogenic groups $A^1$ and $A^2$ have the same significance are especially preferred. Groups $A^1$ and $A^2$ of formula II in which rings C and D each independently signify 1,4-phenylene, which is unsubstituted or substituted with fluorine, pyridine-2,5-diyl or pyrimidine-2,5-diyl are particularly preferred. $Z^1$ in groups of formula II preferably signifies —$CH_2O$—, —COO— or —OOC—; $Z^2$ preferably signifies a single bond, —$CH_2CH_2$—, —$CH_2O$—, $OCH_2$—, —COO— or —OOC—; $Z^3$ preferably signifies —$(CY_2)_m$—, —$(CY_2)_mO$—, —$(CY_2)_mCOO$— or —$(CY_2)_mOOC$—; and Y preferably signifies hydrogen.

The cross-linkable group $R^1$ preferably signifies acrylate, methacrylate, 2-chloroacrylate, 2-phenylacrylate, acryloylphenylene, acrylamide, methacrylamide, 2-phenylacrylamide, epoxy, vinyl ether, vinyl ester, styrene derivative, maleic acid derivative or fumaric acid derivative. These are the groups which can be cross-linked photochemically after orientation of the compounds of formula I in a field. Acrylate, methacrylate, vinyl ether and epoxy are especially preferred groups $R^1$.

The term "derivative" as used herein has the significance which is generally recognized in the art. Derivatives are chemical substances which are related to, and derivable from, the identified chemical substance, such as salts, esters, and the like. The scope of the term "derivative" is readily apparent to the skilled artisan having read the present specification.

The dichroic group $A^3$ preferably signifies a group of the formula

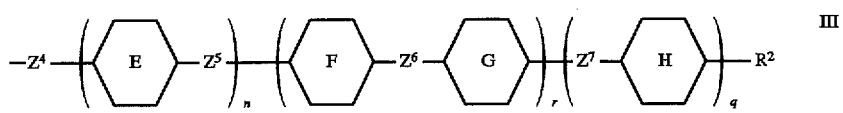
III wherein
rings E and H each independently signify 1,4-phenylene, which is optionally substituted with halogen, methyl and/or cyano, or pyridine-2,5-diyl, pyrimidine-2,5-diyl, trans-1,4-cyclohexylene or trans-1,3-dioxane-2,5-diyl;

ring F signifies 1,4-phenylene, which is optionally substituted with halogen, methyl and/or cyano, or pyridine-2,5-diyl or pyrimidine-2,5-diyl;

ring G signifies 1,4-phenylene, which is optionally mono- or multiply-substituted with halogen, methyl, dimethylamino, amino, nitro and/or cyano, or pyridine-2,5-diyl, pyrimidine-2,5-diyl, 1,4-naphthylene, 2,6-naphthylene, 2,5-pyrazolediyl, 2,5-thiazolediyl, 2,5-benzthiazolediyl, 2,5-imidazolediyl, 2,5-pyrrolediyl or 2,5-thiophenediyl;

$Z^4$ signifies —$CH_2CH_2$—, —$CH_2O$—, —COO—, —OOC—, —$(CH_2)_4$—, —$(CH_2)_3O$—, —$COO(CH_2)_p$— or —$COO(CH_2)_pO$—;

$Z^5$ and $Z^7$ each independently signify a single bond, —$CH_2CH_2$—, —$CH_2O$—, —$OCH_2$—, —COO—, —OOC—, —$(CH_2)_4$—, —$O(CH_2)_3$— or —$(CH_2)_3O$—;

$Z^6$ signifies —N=N—, —N(O)=N—, —CH=CH— or —CH=N—;

n and q each signify 0 or 1;

p signifies a whole number of 1 to 16;

r signifies 0, 1 or 2; and $R^2$ signifies hydrogen, halogen, cyano, —CH=CHNO$_2$, —CH=CHCN, —CH=C(CN)$_2$, nitro, a dialkylamino or cyclobutylamino group or an alkyl, alkoxy or alkanoyloxy group, which is optionally substituted with methoxy, cyano and/or halogen, with the proviso that, when r=0, $R^2$ signifies a substituted anthraquinone group of the formula

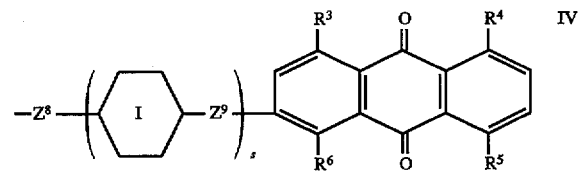
IV wherein
ring I signifies 1,4-phenylene, which is optionally substituted with halogen, methyl and/or cyano, or pyridine-2,5-diyl, pyrimidine-2,5-diyl, trans-1,4-cyclohexylene or trans-1,3-dioxane-2,5-diyl;

Z⁸ signifies —CH₂CH₂—, —CH₂O—, —COO—, —OOC—, —(CH₂)₄—, —(CH₂)₃O—, —COO(CH₂)$_p$— or —COO(CH₂)$_p$O—;

Z⁹ signifies a single bond, —COO(CH₂)$_p$N(CH₃)—, —COO(CH₂)$_p$NH—, —CH₂O—, —OCH₂—, —COO—, —OOC— or —NH—;

s signifies 0 or 1;

p signifies a whole number of 1 to 16; and $R^3, R^4, R^5$ and $R^6$ each independently signify hydrogen, halogen, cyano, —CH═CHNO₂, —CH═CHCN, —CH═C(CN)₂, nitro, hydroxy, a dialkylamino or cyclobutylamino group or an alkyl, alkoxy or alkanoyloxy group, which is optionally substituted with methyl, methoxy, cyano and/or halogen. The dichroic residue $A^3$ also preferably signifies a residue of the formula

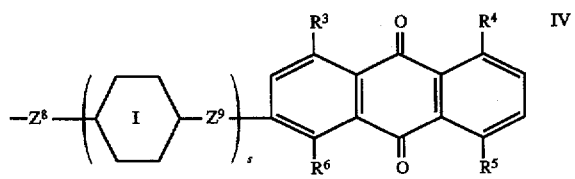

wherein ring I signifies 1,4-phenylene, which is optionally substituted with halogen, methyl and/or cyano, or pyridine-2,5-diyl, pyrimidine-2,5-diyl, trans-1,4-cyclohexylene or trans-1,3-dioxane-2,5-diyl;

Z⁸ signifies —CH₂CH₂—, —CH₂O—, —COO—, —OOC—, —(CH₂)₄—, —(CH₂)₃O—, —COO(CH₂)$_p$— or —COO(CH₂)$_p$O—;

Z⁹ signifies a single bond, —COO(CH₂)$_p$N(CH₃)—, —COO(CH₂)$_p$NH—, —CH₂O—, —OCH₂—, —COO—, —OOC— or —NH—;

s signifies 0 or 1;

p signifies a whole number of 1 to 16; and $R^3, R^4, R^5$ and $R^6$ each independently signify hydrogen, halogen, cyano, —CH═CHNO₂, —CH═CHCN, —CH═C(CN)₂, nitro, hydroxy, a dialkylamino or cyclobutylamino group or an alkyl, alkoxy or alkanoyloxy group, which is optionally substituted with methyl, methoxy, cyano and/or halogen.

The terms used above will be explained hereinafter:

"halogen" signifies fluorine, chlorine or bromine, especially fluorine;

"1,4-phenylene, which is optionally substituted with halogen, methyl and/or cyano," embraces in the scope of the present invention 1,4-phenylene or substituted 1,4-phenylene such as, for example, 2- or 3-fluoro-1,4-phenylene, 2,3-difluoro-1,4-phenylene, 2,6- or 3,5-difluoro-1,4-phenylene, 2- or 3-chloro-1,4-phenylene, 2,3-dichloro-1,4-phenylene, 2,6- or 3,5-dichloro-1,4-phenylene, 2- or 3-bromo-1,4-phenylene, 2- or 3-methyl-1,4-phenylene, 2- or 3-cyano-1,4-phenylene and the like;

"1,4-phenylene, which is optionally substituted with halogen, methyl, dimethylamino, amino, nitro and/or cyano," embraces in the scope of the present invention in addition to the rings enumerated above also 2- or 3-nitro-1,4-phenylene, 2- or 3-dialkylamino-1,4-phenylene and the like;

"dialkylamino" groups embrace dimethylamino, diethylamino, dipropylamino and diisopropylamino groups;

"alkyl, alkoxy or alkanoyloxy groups, which are optionally substituted with methoxy, cyano and/or halogen," embrace in the scope of the present invention groups in which the alkyl group can be straight-chain or branched and which preferably has 1 to 12 carbon atoms. The groups can be mono- or multiply-substituted with methoxy, cyano and/or fluorine, chlorine or bromine. Methyl, ethyl, propyl, butyl, pentyl, methoxy, ethoxy, propyloxy, butoxy, acyloxy, propanoyloxy, butanoyloxy and the like are particularly preferred groups.

The mesophase type of the compounds in accordance with the invention can be influenced by varying the rings in the mesogenic side chains $A^1$ and $A^2$. Thus, aromatic rings such as phenylene have the tendency to produce smectic phases, while saturated rings such as trans-1,4-cyclohexylene or trans-1,3-dioxane-2,5- diyl promote nematic tendencies. Preferably, the mesogenic groups $A^1$ and $A^2$ signify a group of formula II in which n=0 such as, for example

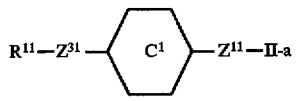   II-a wherein ring $C^1$ signifies phenylene, which is optionally substituted with fluorine;

$Z^{11}$ signifies —CH₂CH₂—, —CH₂O—, —COO—, —OOC—, —(CH₂)₄— or —(CH₂)₃O—;

$Z^{31}$ signifies —(CH₂)$_{m'}$—, —(CH₂)$_{m'}$O—, —(CH₂)$_{m'}$COO— or —(CH₂)$_{m'}$OOC—;

m' signifies a whole number of 4 to 12; and $R^{11}$ signifies acrylate, methacrylate, vinyl ether or epoxy.

Preferably the dichroic group $A^3$ signifies a group of the formula

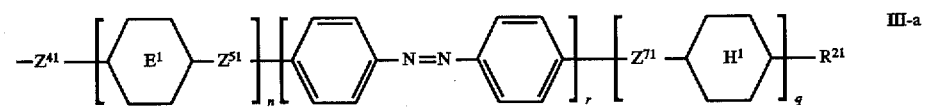   III-a or

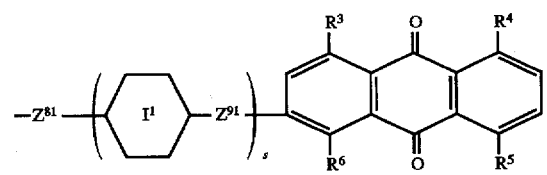   IV-a wherein rings $E^1$ and $H^1$ signify 1,4-phenylene, which is optionally substituted with fluorine;

$Z^{41}$ signifies —COO(CH$_2$)$_{p'}$— or —COO(CH$_2$)$_{p'}$O—;

$Z^{51}$ and $Z^{71}$ each independently signify a single bond, —CH$_2$CH$_2$—, —CH$_2$O—, —COO— or —OOC—;

n, q signify 0 or 1;

r signifies 1;

p' signifies a whole number of 4 to 12;

$R^{21}$ signifies nitro or dimethylamino;

ring I$^1$ signifies phenylene, which is optionally substituted with fluorine, or trans-1,4-cyclohexylene;

$Z^{81}$ signifies —COO(CH$_2$)$_{p'}$— or —COO(CH$_2$)$_{p'}$O—;

$Z^{91}$ signifies a single bond, —COO(CH$_2$)$_p$N(CH$_3$)— or —COO(CH$_2$)$_p$NH—;

s signifies 0 or 1; and $R^3$, $R^4$, $R^5$ and $R^6$ and p have the significances given above.

Compounds of the formula

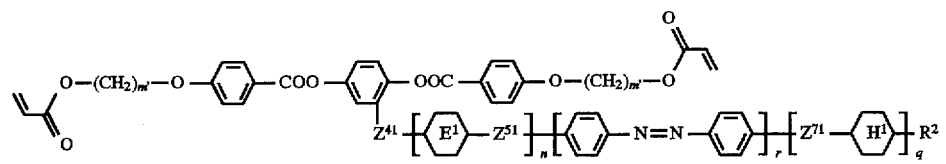

I-a wherein r signifies 1; $R^{21}$ signifies nitro; $Z^{41}$ signifies —COO(CH$_2$)$_{p'}$O—; and the remaining symbols have the aforementioned significances, are particularly preferred. Especially preferred compounds of formula I-a are those in which q signifies 0.

The compounds of formula I in which A$^1$ and A$^2$ have the same significance are very readily accessible synthetically and can be produced, for example, analogously to the methods illustrated in Schemes 1 and 2. Thus, dichroic alcohols (2) and, respectively, (6) can be reacted with bis[2,5-bis[4-(ω-acryloyloxyalkyloxy)]phenylcarboxy]benzoic acids (1) and, respectively, (7). This esterification can be effected, for example, in the presence of N,N'-dicyclohexylcarbodiimide and 4-(dimethylamino)pyridine in dichloromethane or another suitable solvent, such as chloroform. The dichroic alcohols are known or can be prepared, for example, from the esterification product of 4-hydroxybenzaldehyde (3) and a chromophore-containing benzoic acid (4) by reducing the aldehyde (5) with sodium borohydride.

Compounds of formula I in which A$^1$ and A$^2$ are different can be produced starting from asymmetric 2-[4-(w-acryloyloxyalkyloxy)phenylcarboxy]-5-[4-(ω-acryloyloxyalkyloxy)phenylcarboxy]benzoic acids. These can be prepared, for example, by the mono-esterification of 2,5-dihydroxybenzaldehyde with a 4-(ω-acryloyloxyalkyloxy)benzoic acid to the monoester and subsequent esterification with another 4-(ω-acryloyloxyalkyloxy)benzoic acid to the diester. Oxidation with Jones' reagent gives the corresponding asymmetric 2-[4-(ω-acryloyloxyalkyloxy)phenylcarboxy]5-[4-(ω-acryloyloxyalkyloxy)]phenylcarboxy]benzoic acid. The starting materials are known and are in part commercially available.

The symbols in the Schemes have the aforementioned significances.

Scheme 1
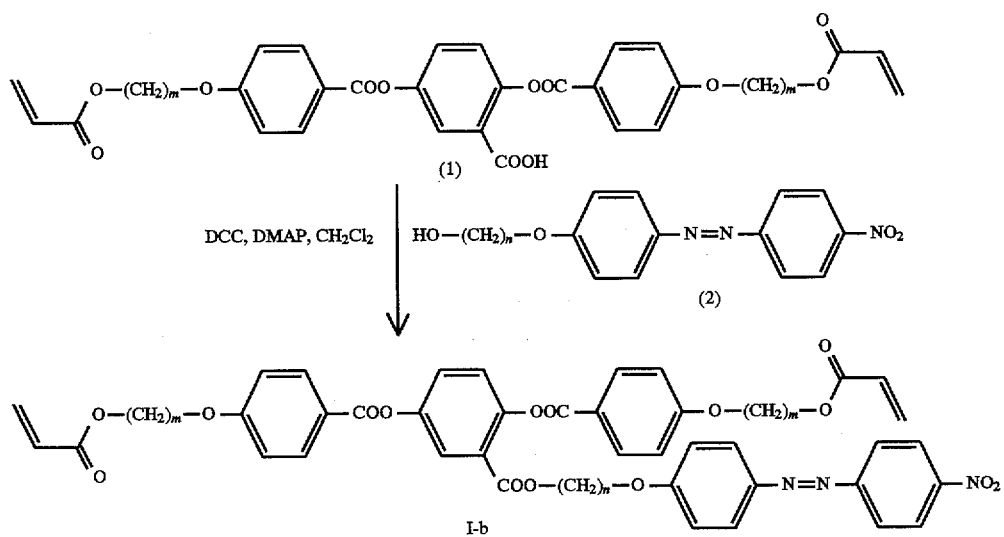
Scheme 2
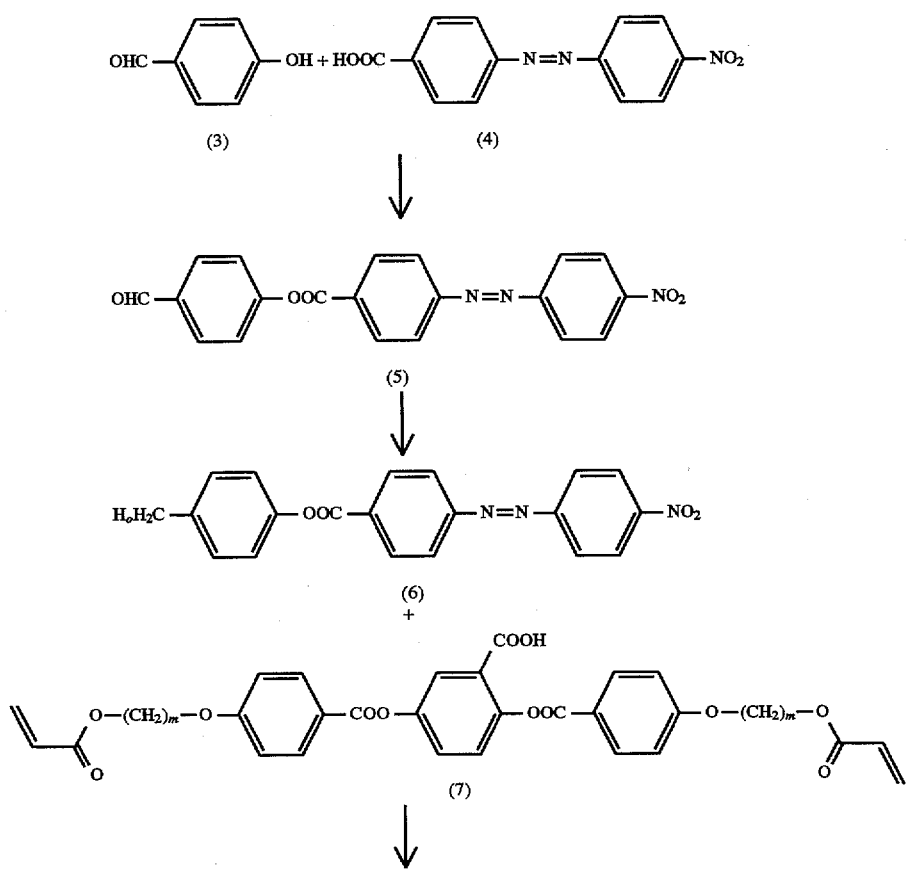

-continued
Scheme 2

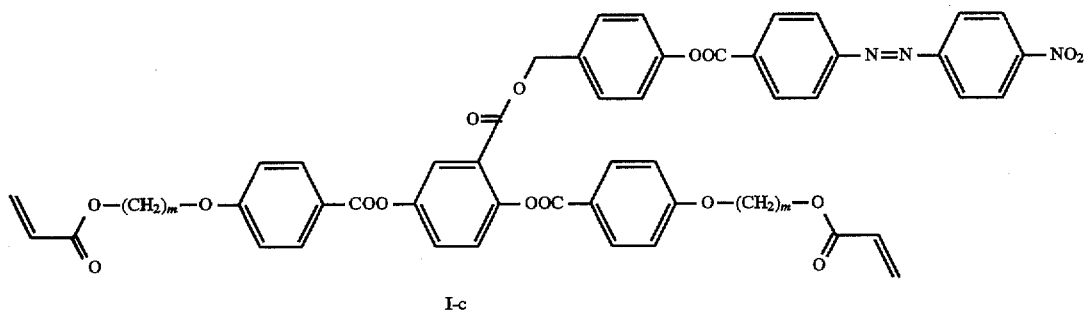

I-c

A small amount of BHT (2,6-di-tert.-butyl-4-methylphenol/"butylhydroxytoluene") is included in each step in order to stop undesired thermal cross-linkage.

The compounds of formulae I can be used as single compounds or in the form of mixtures with one another and/or with other liquid crystal components.

The liquid crystalline mixtures in accordance with the invention contain at least 2 components, of which at least one component is a compound of formula I. A second component and any other components can be additional compounds of formula I or other known liquid crystalline compounds having a photo cross-linkable group. One or more chiral components can also be present in the mixture.

Having regard to the good solubility of the compounds of formula I and having regard to their good miscibility with one another, the content of compounds of formula I in the mixtures in accordance with the invention can be high and can amount to up to 100 wt. %.

The mixtures in accordance with the invention preferably contain, in addition to one or more compounds of formula I, one or more compounds from the group of compounds of the formulas

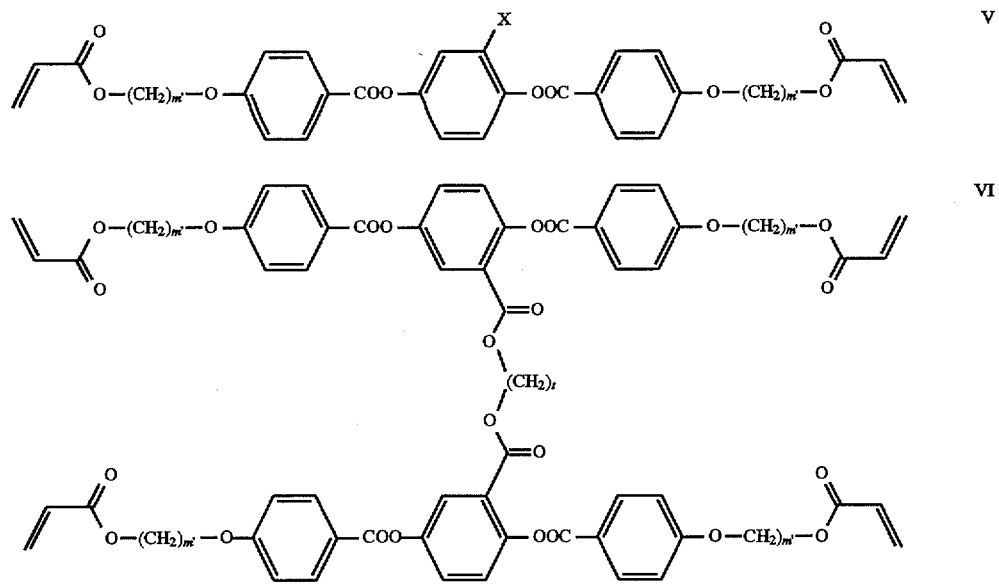

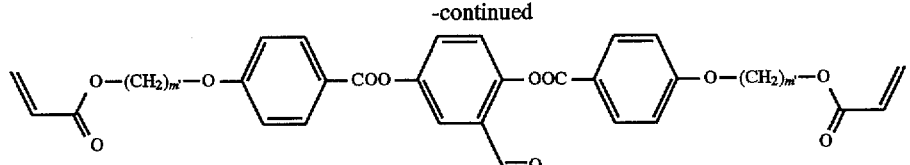
VII
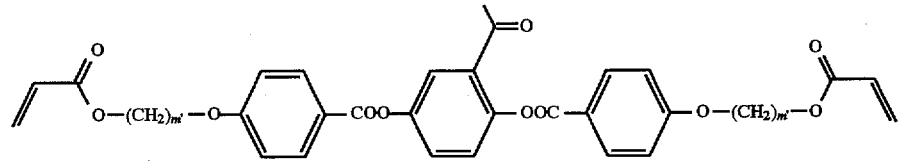
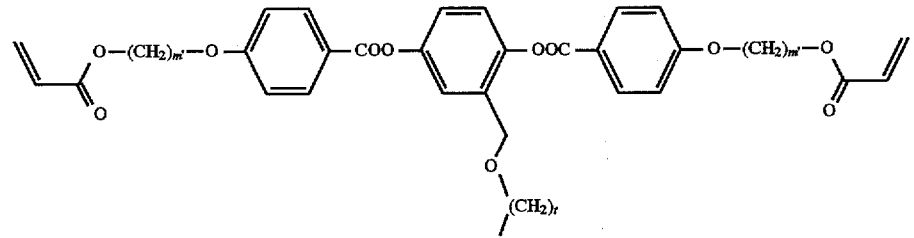
VIII
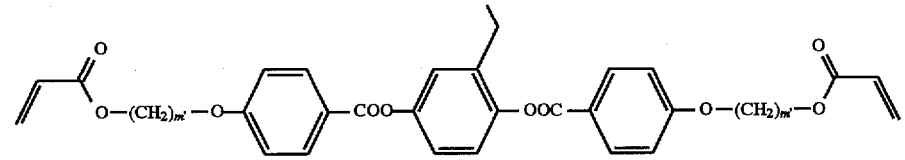
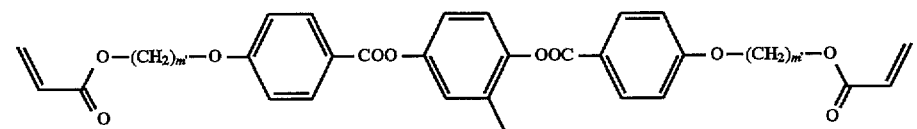
IX
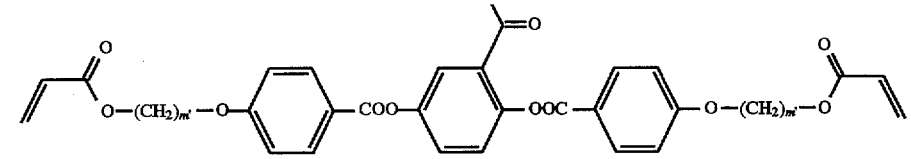
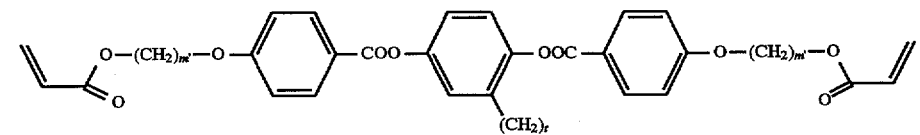
X
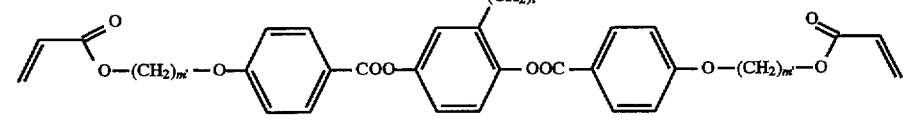

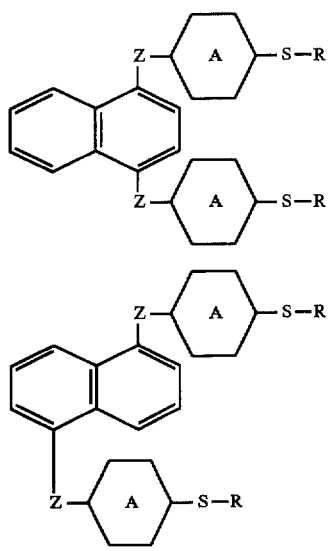

wherein

X signifies hydrogen, fluorine, chlorine, bromine or methyl;

m' signifies a whole number of 4 to 12;

t signifies a whole number of 1 to 12;

Z signifies —OCH$_2$— or —OOC—;

A signifies 1,4-phenylene or 2- or 3-fluoro-1,4-phenylene;

S signifies —(CH$_2$)$_{m'}$— or —(CH$_2$)$_{m'}$O—; and

R signifies acrylate, methacrylate, vinyl ether or epoxy.

The production of the compounds of formula I and of liquid crystalline mixtures containing these compounds is illustrated in more detail by the following Examples. C signifies a crystalline phase, S signifies a smectic phase, N signifies a nematic phase and signifies the isotropic phase.

The experiments in the following examples exemplify the invention. Compounds having melting point ("m.p.") and clearing point ("cl.p.") data were actually synthesized.

EXAMPLE 1

0.2 g of N,N'-dicyclohexyldicarbodiimide (DCC) was added at room temperature while stirring to a solution of 0.5 g of 2,5-bis[4-(6-acryloyloxyhexyloxy)phenylcarboxy] benzoic acid, 0.25 g of 6-[4-(4-nitrophenylazo)phenoxy] hexanol and 0.04 g of 4-dimethylaminopyridine (DMAP) in 25 ml of dichloromethane. The reaction mixture was stirred at room temperature overnight, poured into 100 ml of water and then extracted three times with 50 ml of dichloromethane each time. The organic phases were combined, washed twice with 100 ml of water each time, dried over magnesium sulphate, filtered and the filtrate was concentrated. Chromatographic purification of the residue on silica gel with hexane/ethyl acetate (vol 1:1) and two-fold recrystallization from acetone of the fractions which were pure according to thin-layer chromatography gave 0.4 g of 6-[4-(4-nitrophenylazo)phenoxy]hexyl 2,5-bis[4-(6-acryloyloxyhexyloxy)phenylcarboxy]benzoate; m.p. (C-N) 72° C., cl.p. (N-I) 127° C.

The following compounds can be produced in an analogous manner:

2-[4-(4-Nitrophenylazo)phenoxy]ethyl 2,5-bis[4-(6-acryloyloxyhexyloxy)phenylcarboxy]benzoate; m.p. (C-N) 122° C., cl.p. (N-I) 162° C.

3-[4-(4-Nitrophenylazo)phenoxy]propyl 2,5-bis[4-(6-acryloyloxyhexyloxy)phenylcarboxy]benzoate.

4-[4-(4-Nitrophenylazo)phenoxy]butyl 2,5-bis[4-(6-acryloyloxyhexyloxy)phenylcarboxy]benzoate; m.p. (C-N) 113° C., cl.p. (N-I) 142° C.

5-[4-(4-Nitrophenylazo)phenoxy]pentyl 2,5-bis[4-(6-acryloyloxyhexyloxy)phenylcarboxy]benzoate; m.p. (C-N) 98° C., cl.p. (N-I)

7-[4-(4-Nitrophenylazo)phenoxy]heptyl 2,5-bis[4-(6-acryloyloxyhexyloxy)phenylcarboxy]benzoate.

8-[4-(4-Nitrophenylazo)phenoxy]octyl 2,5-bis[4-(6-acryloyloxyhexyloxy)phenylcarboxy]benzoate; m.p. (C-N) 86° C., cl.p. (N-I) 119° C.

9-[4-(4-Nitrophenylazo)phenoxy]nonyl 2,5-bis([4-(6-acryloyloxyhexyloxy)phenylcarboxy]benzoate.

10-[4-(4-Nitrophenylazo)phenoxy]decyl 2,5-bis [4-(6-acryloyloxyhexyloxy)phenylcarboxy]benzoate.

11-[4-(4-Nitrophenylazo)phenoxy]undecyl 2,5-bis [4-(6-acryloyloxyhexyloxy)phenylcarboxy]benzoate.

12-[4-(4-Nitrophenylazo)phenoxy]dodecyl 2,5-bis[4-(6-acryloyloxyhexyloxy)phenylcarboxy]benzoate.

2-[4-(4-Dimethylaminophenylazo)phenoxy]ethyl 2,5-bis[4-(6-acryloyloxyhexyloxy)phenylcarboxy]benzoate; m.p. (C-N) 124° C., cl.p. (N-I) 166° C.

3-[4-(4-Dimethylaminophenylazo)phenoxy]propyl 2,5-bis [4-(6-acryloyloxyhexyloxy)phenylcarboxy]benzoate.

4-[4-(4-Dimethylaminophenylazo)phenoxy]butyl 2,5-bis[4-(6-acryloyloxyhexyloxy)phenylcarboxy]benzoate; m.p. (C-N) 100° C., cl.p. (N-I) 149° C.

5-[4-(4-Dimethylaminophenylazo)phenoxy]pentyl 2,5-bis ([4-(6-acryloyloxyhexyloxy)phenylcarboxy]benzoate; m.p. (C-N) 80° C., cl.p. (N-I) 113° C.

6-[4-(4-Dimethylaminophenylazo)phenoxy]hexyl 2,5-bis[4-(6-acryloyloxyhexyloxy) phenylcarboxy]benzoate; m.p. (C-N) 90° C., cl.p. (N-I) 137° C.

7-[4-(4-Dimethylaminophenylazo)phenoxy]heptyl 2,5-bis [4-(6-acryloyloxyhexyloxy)phenylcarboxy]benzoate.

8-[4-(4-Dimethylaminophenylazo)phenoxy]octyl 2,5-bis[4-(6-acryloyloxyhexyloxy)phenylcarboxy]benzoate; m.p. (C-N) 98° C., cl.p. (N-T) 131° C.

9-[4-(4-Dimethylaminophenylazo)phenoxy]nonyl 2,5-bis [4-(6-acryloyloxyhexyloxy)phenylcarboxy]benzoate.

10-[4-(4-Dimethylaminophenylazo)phenoxy]decyl 2,5-bis [4-(6-acryloyloxyhexyloxy)]phenylcarboxy]benzoate.

11-[4-(4-Dimethylaminophenylazo)phenoxy]undecyl 2,5-bis[4-(6-acryloyloxyhexyloxy)phenylcarboxy]benzoate.

12-[4-(4-Dimethylaminophenylazo)phenoxy]dodecyl 2,5-bis[4-(6-acryloyloxyhexyloxy)phenylcarboxy]benzoate.
6-[4-(4-Nitrophenylazoxy)phenoxy]hexyl 2,5-bis[4-(3-acryloyloxypropyloxy)phenylcarboxy]benzoate.
6-[4-(4-Nitrophenylazoxy)phenoxy]hexyl 2,5-bis[4-(4-acryloyloxybutyloxy)phenylcarboxy]benzoate.
6-[4-(4-Nitrophenylazoxy)phenoxy]hexyl 2,5-bis[4-(5-acryloyloxypentyloxy)phenylcarboxy]benzoate.
6-[4-(4-Nitrophenylazoxy)phenoxy]hexyl 2,5-bis[4-(7-acryloyloxyheptyloxy)phenylcarboxy]benzoate.
6-[4-(4-Nitrophenylazoxy)phenoxy]hexyl 2,5-bis[4-(8-acryloyloxyoctyloxy)phenylcarboxy]benzoate.
6-[4-(4-Nitrophenylazoxy)phenoxy]hexyl 2,5-bis[4-(9-acryloyloxynonyloxy)phenylcarboxy]benzoate.
6-[4-(4-Nitrophenylazoxy)phenoxy]hexyl 2,5-bis[4-(10-acryloyloxydecyloxy)phenylcarboxy]benzoate.
6-[4-(4-Nitrophenylazoxy)phenoxy]hexyl 2,5-bis[4-(11-acryloyloxyundecyloxy)phenylcarboxy]benzoate; m.p. (C-S$_A$) 65 °C., S$_A$-N, 98° C., cl.p. (N-I) 121° C.
6-[4-(4-Nitrophenylazoxy)phenoxy]hexyl 2,5-bis[4-(12-acryloyloxydodecyloxy)phenylcarboxy]benzoate.
6-[4-(4-Dimethylaminophenylazoxy)phenoxy]hexyl 2,5-bis[4-(3-acryloyloxypropyloxy)phenylcarboxy]benzoate.
6-[4-(4-Dimethylaminophenylazoxy)phenoxy]hexyl 2,5-bis[4-(4-acryloyloxybutyloxy)phenylcarboxy]benzoate.
6-[4-(4-Dimethylaminophenylazoxy)phenoxy]hexyl 2,5-bis[4-(5-acryloyloxypentyloxy)phenylcarboxy]benzoate.
6-[4-(4-Dimethylaminophenylazoxy)phenoxy]hexyl 2,5-bis[4-(7-acryloyloxyheptyloxy)phenylcarboxy]benzoate.
6-[4-(4-Dimethylaminophenylazoxy)phenoxy]hexyl 2,5-bis[4-(8-acryloyloxyoctyloxy)phenylcarboxy]benzoate.
6-[4-(4-Dimethylaminophenylazoxy)phenoxy]hexyl 2,5-bis[4-(9-acryloyloxynonyloxy)phenylcarboxy]benzoate.
6-[4-(4-Dimethylaminophenylazoxy)phenoxy]hexyl 2,5-bis[4-(10-acryloyloxydecyloxy)phenylcarboxy]benzoate.
6-[4-(4-Dimethylaminophenylazoxy)phenoxy]hexyl 2,5-bis[4-(11-acryloyloxyundecyloxy)phenylcarboxy]benzoate.
6-[4-(4-Dimethylaminophenylazoxy)phenoxy]hexyl 2,5-bis[4-(12-acryloyloxydodecyloxy) phenylcarboxy]benzoate.

EXAMPLE 2

0.2 g of N,N'-dicyclohexylcarbodiimide is added at room temperature while stirring to a solution of 0.6 g of 2,5-bis[4-(6-acryloyloxyhexyloxy)phenylcarboxy]benzoic acid, 0.4 g of (4-[4-(4-nitrophenylazo)benzoyloxy]phenyl) methanol and 0.04 g of 4-dimethylaminopyridine in 20 ml of dichloromethane. The reaction as mixture is stirred at room temperature overnight, poured into 100 ml of water and then extracted three times with 50 ml of dichloromethane each time. The organic phases are combined, washed twice with 100 ml of water each time, dried over magnesium sulphate, filtered and the filtrate is concentrated. Chromatographic purification of the residue on silica gel with hexane/ethyl acetate (vol. 1:1) and two-fold recrystallization from acetone of the fractions which are pure according to thin-layer chromatography gives 0.4 g of (4-[4-(4-nitrophenylazo)benzoyloxy]phenyl)methyl 2,5-bis[4-(6-acryloyloxyhexyloxy)phenylcarboxy]benzoate.

The (4-[4-(4-nitrophenylazo)benzoyloxy]phenyl) methanol used as the starting material is prepared as follows:

(a) A mixture of 0.13 g of sodium borohydride and 15 ml of water is treated dropwise at 0° C. with a solution of 0.8 g of 4-[4-(4-nitrophenylazo)benzoyloxy]benzaldehyde in 100 ml of dioxan. The reaction mixture is stirred at 0° C. for 60 minutes and then at room temperature for 10 minutes, poured into 100 ml of dichloromethane and washed twice with 100 ml of water each time. The aqueous phases are combined and extracted twice with 50 ml of dichloromethane each time. The organic phases are combined, washed twice with 100 ml of water each time, dried over magnesium sulphate, the suspension is filtered and the filtrate is concentrated. The residue is used in the next step without further purification.

(b) 0.6 g of N,N'-dicyclohexylcarbodiimide is added at room temperature while stirring to a solution of 1.0 g of 4-(4-nitrophenylazo)benzoic acid, 0.3 g of 4-hydroxybenzaldehyde and 0.04 g of 4-dimethylaminopyridine in 20 ml of dichlormethane. The reaction mixture is stirred at room temperature overnight, poured into 100 ml of water and then extracted three times with 50 ml of dichloromethane each time. The organic phases are combined, washed twice with 100 ml of water each time, dried over magnesium sulphate, filtered and the filtrate is concentrated. Chromatographic purification of the residue on silica gel with hexane/ethyl acetate (vol. 1:1) and two-fold recrystallization from ethanol of the fractions which are pure according to thin-layer chromatography gives 0.9 g of 4-[4-(4-nitrophenylazo)benzoyloxy] benzaldehyde.

The following compounds can be produced in an analogous manner:

(4-[4-(4-Nitrophenylazo)benzoyloxy]phenyl)methyl 2,5-bis[4-(7-acryloyloxyheptyloxy)phenylcarboxy]benzoate.
(4-[4-(4-Nitrophenylazo)benzoyloxy]phenyl)methyl 2,5-bis[4-(8-acryloyloxyoctyloxy)phenylcarboxy]benzoate.
(4-[4-(4-Nitrophenylazo)benzoyloxy]phenyl)methyl 2,5-bis[4-(9-acryloyloxynonyloxy) phenylcarboxy]benzoate.
(4-[4-(4-Nitrophenylazo)benzoyloxy]phenyl)methyl 2,5-bis[4-(10-acryloyloxydecyloxy)phenylcarboxy]benzoate.
(4-[4-(4-Nitrophenylazo)benzoyloxy]phenyl)methyl 2,5-bis[4-(11-acryloyloxyundecyloxy)phenylcarboxy]benzoate.
(4-[4-(4-Nitrophenylazo)benzoyloxy]phenyl)methyl 2,5-bis[4-(12-acryloyloxydodecyloxy) phenylcarboxy]benzoate.
(4-[4-(4-Dimethylphenylazo)benzoyloxy]phenyl)methyl 2,5-bis[4-(6-acryloyloxyhexyloxy)phenylcarboxy]benzoate.
(4-[4-(4-Dimethylphenylazo)benzoyloxy]phenyl)methyl 2,5-bis[4-(7-acryloyloxyheptyloxy)phenylcarboxy] benzoate.
(4-[4-(4-Dimethylphenylazo)benzoyloxy]phenyl)methyl 2,5-bis[4-(8-acryloyloxyoctyloxy)phenylcarboxy]benzoate.
(4-[4-(4-Dimethylphenylazo)benzoyloxy]phenyl)methyl 2,5-bis[4-(9-acryloyloxynonyloxy)phenylcarboxy] benzoate.
(4-[4-(4-Dimethylphenylazo)benzoyloxy]phenyl)methyl 2,5-bis[4-(10-acryloyloxydecyloxy)phenylcarboxy] benzoate.
(4-[4-(4-Dimethylphenylazo)benzoyloxy]phenyl)methyl 2,5-bis[4-(11-acryloyloxyundecyloxy)phenylcarboxy] benzoate.
(4-[4-(4-Dimethylphenylazo)benzoyloxy]phenyl)methyl 2,5-bis[4-(12-acryloyloxydodecyloxy)phenylcarboxy] benzoate.

EXAMPLE 3

A solution of 0.6 g of 2,5-bis[4-(6-acryloyloxyhexyloxy) phenylcarboxy]benzoic acid, 0.4 g of (4-[4-(4-nitrophenylazo)benzoyloxy]phenoxy)ethanol and 0.04 g of 4-dimethylaminopyridine is reacted with 0.2 g of N,N'-dicyclohexyldicarbodiimide and 20 ml of dichloromethane in an analogous manner to Example 1 to give (4-[4-(4-nitrophenylazo)benzoyloxy]phenoxy)ethyl 2,5-bis[4-(6-acryloyloxyhexyloxy)phenylcarboxy]benzoate.

The (4-[4-(4-nitrophenylazo)benzoyloxy]phenoxy) ethanol used as the starting material is prepared as follows:

(a) A solution of 0.35 g of 4-(4-nitrophenylazo)benzoic acid, 0.2 g of (4-hydroxyphenoxy)ethanol and 0.04 g of 4-dimethylaminopyridine is reacted with 0.4 g of N,N'-dicyclohexyldicarbodiimide and 50 ml of dichloromethane in an analogous manner to Example 1 to give 0.4 g of (4-[4-(4-nitrophenylazo)benzoyloxy]phenoxy)ethanol.

The following compounds can be prepared in an analogous manner:

(4-[4-(4-Nitrophenylazo)benzoyloxy]phenoxy)ethyl 2,5-bis[4-(7-acryloyloxyheptyloxy)phenylcarboxy]benzoate.
(4-[4-(4-Nitrophenylazo)benzoyloxy]phenoxy)ethyl 2,5-bis(4-[8-acryloyloxyoctyloxy)phenylcarboxy]benzoate.
(4-[4-(4-Nitrophenylazo)benzoyloxy]phenoxy)ethyl 2,5-bis[4-(9-acryloyloxynonyloxy)phenylcarboxy]benzoate.
(4-[4-(4-Nitrophenylazo)benzoyloxy]phenoxy)ethyl 2,5-bis[4-(10-acryloyloxydecyloxy)phenylcarboxy]benzoate.
(4-[4-(4-Nitrophenylazo)benzoyloxy]phenoxy)ethyl 2,5-bis[4-(11-acryloyloxyundecyloxy)phenylcarboxy]benzoate.
(4-[4-(4-Nitrophenylazo)benzoyloxy]phenoxy)ethyl 2,5-bis[4-(12-acryloyloxydodecyloxy)phenylcarboxy]benzoate.
(4-[4-(4-Dimethylphenylazo)benzoyloxy]phenoxy)ethyl 2,5-bis[4-(6-acryloyloxyhexyloxy)phenylcarboxy]benzoate.
(4-[4-(4-Dimethylphenylazo)benzoyloxy]phenoxy)ethyl 2,5-bis[4-(7-acryloyloxyheptyloxy)phenylcarboxy]benzoate.
(4-[4-(4-Dimethylphenylazo)benzoyloxy]phenoxy)ethyl 2,5-bis[4-(8-acryloyloxyoctyloxy)phenylcarboxy]benzoate.
(4-[4-(4-Dimethylphenylazo)benzoyloxy]phenoxy)ethyl 2,5-bis[4-(9-acryloyloxynonyloxy)phenylcarboxy]benzoate.
(4-[4-(4-Dimethylphenylazo)benzoyloxy]phenoxy)ethyl 2,5-bis[4-(10-acryloyloxydecyloxy)phenylcarboxy]benzoate.
(4-[4-(4-Dimethylphenylazo)benzoyloxy]phenoxy)ethyl 2,5-bis[4-(11-acryloyloxyundecyloxy)phenylcarboxy]benzoate.
(4-[4-(4-Dimethylphenylazo)benzoyloxy]phenoxy)ethyl 2,5-bis[4-(12-acryloyloxydodecyloxy)phenylcarboxy]benzoate.

EXAMPLE 4

A mixture of 95 wt. % pentyl 2,5-bis[4-(6-acryloyloxyhexyloxy)phenylcarboxy]benzoate and 5 wt. % 6-[4-(4-nitrophenylazo)phenoxy]hexyl 2,5-bis[4-(6-acryloyloxyhexyloxy)phenylcarboxy]-benzoate was provided, treated with 1 wt. % of a photoinitiator (IRGACURE, Ciba Geigy), dissolved in anisole (20 wt. %) and then spun as on to a glass plate at 2000 revolutions per minute. The glass plate had previously been coated with poly[methacryloyloxyethyl 3-(E)-[4-cyano-4'-biphenyl] acrylate] and irradiated with linear polarized light. Thereby, a predetermined structure was inscribed photolithographically by means of a mask in the (PPN) layer. The new layer (on the PPN layer) was dried at 90° C. on a heating block and then irradiated with xenon light in a vacuum oven under a vacuum and 90° C. The inscribed original structure remained and was copied faithfully by the new network. A clear dichroic absorption (orange) was recognizable. This layer can be used as a structured absorption filter.

Upon reading the present specification various alternative embodiments will become obvious to those skilled in the art. These variations are to be considered within the scope and spirit of the invention which is only to be limited by the claims that follow and their equivalents.

What is claimed is:

1. A compound of the formula

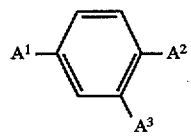

I wherein $A^1$ and $A^2$ each independently is a cross-linkable, mesogenic group; and $A^3$ is a dichroic group.

2. The compound according to claim 1, wherein $A^1$ and $A^2$ each independently is a group of the formula

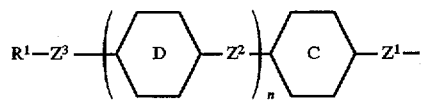

II wherein rings C and D each independently is pyridine-2,5-diyl, pyrimidine-2,5-diyl, trans-1,4-cyclohexylene, trans-1,3-dioxane-2,5-diyl, unsubstituted 1,4-phenylene, or 1,4-phenylene which is substituted with at least one substituent selected from the group consisting of halogen, methyl, and cyano;

$Z^1$ is —$CH_2CH_2$—, —$CH_2O$—, —COO—, —OOC—, —$(CH_2)_4$—, or —$(CH_2)_3O$—;

$Z^2$ is a single bond, —$CH_2CH_2$—, —$CH_2O$—, —$OCH_2$—, —COO—, —OOC—, —$(CH_2)_4$—, —$O(CH_2)_3$—, or —$(CH_2)_3O$—;

$Z^3$ is —$(CY_2)_m$—, —$O(CY_2)_m$—, —$(CY_2)_mO$—, —$(CY_2)_mCOO$—, —$(CY_2)_mOOC$—, —$(Si[(CH_3)_2]O)_m$—, —$OCH_2(Si[(CH_3)_2]O)_m$—$Si[(CH_3)_2]CH_2O$—, or —$NHCH_2(Si[(CH_3)_2]O)_m$—$Si[(CH_3)_2]CH_2NH$—;

Y is hydrogen or fluorine;

n is 0 or 1;

m is a whole number from 1 to 16 inclusive; and $R^1$ is a cross-linkable group.

3. The compound of claim 2, wherein $R^1$ is selected from the group consisting of ethylene, acrylate, methacrylate, 2-chloroacrylate, 2-phenylacrylate, acryloylphenylene, acrylamide, methacrylamide, 2-chloroacrylamide, 2-phenylacrylamide, epoxy, itaconic acid ester, vinyl ether, vinyl ester, styrene derivative, siloxane, ethyleneimine derivative, maleic acid derivative, fumaric acid derivative, an unsubstituted cinnamic acid derivative, and a cinnamic acid derivative which is substituted with one or more substituents selected from the group consisting of methyl, methoxy, cyano, and halogen.

4. The compound according to claim 2, wherein $A^1$ and $A^2$ are the same.

5. The compound according to claim 1, wherein $A^3$ is a group of the formula

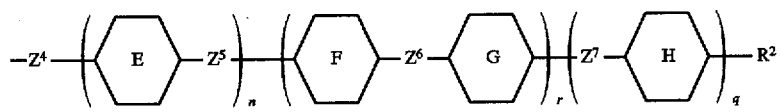

wherein
- rings E and H each independently is pyridine-2,5-diyl, pyrimidine-2,5-diyl, trans-1,4-cyclohexylene, trans-1,3-dioxane-2,5-diyl, unsubstituted 1,4-phenylene, or 1,4-phenylene which is substituted with at least one substituent selected from the group consisting of halogen, methyl, and cyano;
- ring F is pyridine-2,5-diyl, pyrimidine-2,5-diyl, unsubstituted 1,4-phenylene, or 1,4-phenylene which is substituted with at least one substituent selected from the group consisting of halogen, methyl, and cyano;
- ring G is pyridine-2,5-diyl, pyrimidine-2,5-diyl, 1,4-naphthylene, 2,6-naphthylene, 2,5-pyrazolediyl, 2,5-thiazolediyl, 2,5-benzthiazolediyl, 2,5-imidazolediyl, 2,5-pyrrolediyl, 2,5-thiophenediyl, unsubstituted 1,4-phenylene, or 1,4-phenylene which is substituted with at least one substituent selected from the group consisting of halogen, methyl, dimethylamino, amino, nitro, and cyano;
- $Z^4$ is —$CH_2CH_2$—, —$CH_2O$—, —COO—, —OOC—, —$(CH_2)_4$—, —$(CH_2)_3O$—, —$COO(CH_2)_p$—, or —$COO(CH_2)_pO$—;
- $Z^5$ and $Z^7$ each independently is a single bond, —$CH_2CH_2$—, —$CH_2O$—, —$OCH_2$—, —COO—, —OOC—, —$(CH_2)_4$—, —$O(CH_2)_3$—, or —$(CH_2)_3O$—;
- $Z^6$ is —N=N—, —N(O)=N—, —CH=CH—, or —CH=N—;
- n and q each is 0 or 1;
- p is a whole number from 1 to 16 inclusive;
- r is 0, 1, or 2; and
- $R^2$ is hydrogen, halogen, cyano, —CH=CHNO$_2$, —C=CHCN, —CH=C(CN)$_2$, nitro, a dialkylamino group, a cyclobutylamino group, an alkyl group, an alkoxy group, an alkanoyloxy group, an alkyl group which is substituted with at least one substituent selected from the group consisting of methoxy, cyano, and halogen, an alkoxy group which is substituted with at least one substituent selected from the group consisting of methoxy, cyano, and halogen, or an alkanoyloxy group which is substituted with at least one substituent selected from the group consisting of methoxy, cyano, and halogen,
- provided that, when r=0, $R^2$ is a group of the formula

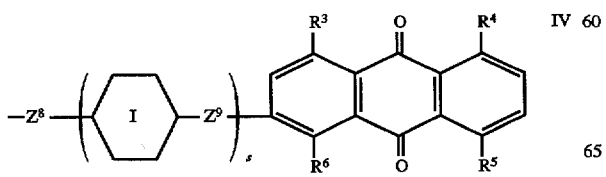

wherein
- ring I is pyridine-2,5-diyl, pyrimidine-2,5-diyl, trans-1,4-cyclohexylene, trans-1,3-dioxane-2,5-diyl, unsubstituted 1,4-phenylene, or 1,4-phenylene which is substituted with at least one substituent selected from the group consisting of halogen, methyl, and cyano;
- $Z^8$ is —$CH_2CH_2$—, —$CH_2O$—, —COO—, —OOC—, —$(CH_2)_4$—, —$(CH_2)_3O$—, —$COO(CH_2)_p$—, or —$COO(CH_2)_pO$—;
- $Z^9$ is a single bond, —$COO(CH_2)_pN(CH_3)$—, —COO$(CH_2)_pNH$—, —$CH_2O$—, —$OCH_2$—, —COO—, —OOC—, or —NH—;
- s is 0 or 1;
- p is a whole number from 1 to 16 inclusive; and
- $R^3$, $R^4$, $R^5$ and $R^6$ each independently is hydrogen, halogen, cyano, —CH=CHNO$_2$, —CH=CHCN, —CH=C(CN)$_2$, nitro, hydroxy, a dialkylamino group, cyclobutylamino group, an alkyl group, an alkoxy group, an alkanoyloxy group, an alkyl group which is substituted with at least one substituent selected from the group consisting of methyl, methoxy, cyano, and halogen, an alkoxy group which is substituted with at least one substituent selected from the group consisting of methyl, methoxy, cyano, and halogen, or an alkanoyloxy group which is substituted with at least one substituent selected from the group consisting of methyl, methoxy, cyano, and halogen.

6. The compound according to claim 2, wherein $A^3$ is a group of the formula

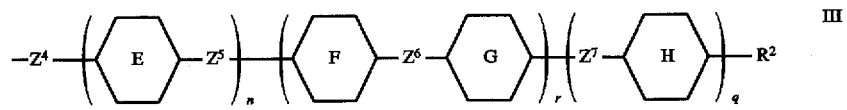

wherein
- rings E and H each independently is pyridine-2,5-diyl, pyrimidine-2,5-diyl, trans-1,4-cyclohexylene, trans-1,3-dioxane-2,5-diyl, unsubstituted 1,4-phenylene, or 1,4-phenylene which is substituted with at least one substituent selected from the group consisting of halogen, methyl, and cyano;
- ring F is pyridine-2,5-diyl, pyrimidine-2,5-diyl, unsubstituted 1,4-phenylene, or 1,4-phenylene which is substituted with at least one substituent selected from the group consisting of halogen, methyl, and cyano;
- ring G is pyridine-2,5-diyl, pyrimidine-2,5-diyl, 1,4-naphthylene, 2,6-naphthylene, 2,5pyrazolediyl, 2,5-thiazolediyl, 2,5-benzthiazolediyl, 2,5-imidazolediyl, 2,5-pyrrolediyl, 2,5-thiophenediyl, unsubstituted 1,4-phenylene, or 1,4-phenylene which is substituted with at least one substituent selected from the group consisting of halogen, methyl, dimethylamino, amino, nitro, and cyano;

$Z^4$ is —CH₂CH₂—, —CH₂O—, —COO—, —OOC—, —(CH₂)₄—, —(CH₂)₃O—, —COO(CH₂)$_p$—, or —COO(CH₂)$_p$O—;

$Z^5$ and $Z^7$ each independently is a single bond, —CH₂CH₂—, —CH₂O—, —OCH₂—, —COO—, —OOC—, —(CH₂)₄—, —O(CH₂)₃—, or —(CH₂)₃O—;

$Z^6$ is —N=N—, —N(O)=N—, —CH=CH—, or —CH=N—;

n and q each is 0 or 1;

p is a whole number from 1 to 16 inclusive;

r is 0, 1, or 2; and $R^2$ is hydrogen, halogen, cyano, —CH=CHNO₂, —CH=CHCN, —CH=C(CN)₂, nitro, a dialkylamino group, a cyclobutylamino group, an alkyl group, an alkoxy group, an alkanoyloxy group, an alkyl group which is substituted with at least one substituent selected from the group consisting of methoxy, cyano, and halogen, an alkoxy group which is substituted with at least one substituent selected from the group consisting of methoxy, cyano, and halogen, or an alkanoyloxy group which is substituted with at least one substituent selected from the group consisting of methoxy, cyano, and halogen, provided that, when r=0, $R^2$ is a group of the formula

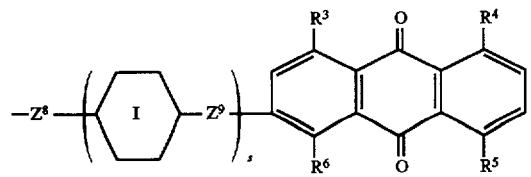

wherein ring I is pyridine-2,5-diyl, pyrimidine-2,5-diyl, trans-1,4-cyclohexylene, trans-1,3-dioxane-2,5-diyl, unsubstituted 1,4-phenylene, or 1,4-phenylene which is substituted with at least one substituent selected from the group consisting of halogen, methyl, and cyano;

$Z^8$ is —CH₂CH₂—, —CH₂O—, —COO—, —OOC—, —(CH₂)₄—, —(CH₂)₃O—, —COO(CH₂)$_p$—, or —COO(CH₂)$_p$O—;

$Z^9$ is a single bond, —COO(CH₂)$_p$N(CH₃)—, —COO(CH₂)$_p$NH—, —CH₂O—, —OCH₂—, —COO—, —OOC— or —NH—;

s is 0 or 1;

p is a whole number from 1 to 16 inclusive; and $R^3, R^4, R^5$ and $R^6$ each independently is hydrogen, halogen, cyano, —CH=CHNO₂, —CH=CHCN, —CH=C(CN)₂, nitro, hydroxy, a dialkylamino group, a cyclobutylamino group, an alkyl group, an alkoxy group, an alkanoyloxy group, an alkyl group which is substituted with at least one substituent selected from the group consisting of methyl, methoxy, cyano, and halogen, an alkoxy group which is substituted with at least one substituent selected from the group consisting of methyl, methoxy, cyano, and halogen, or an alkanoyloxy group which is substituted with at least one substituent selected from the group consisting of methyl, methoxy, cyano, and halogen.

7. The compound according to claim 1, wherein $A^3$ is a group of the formula

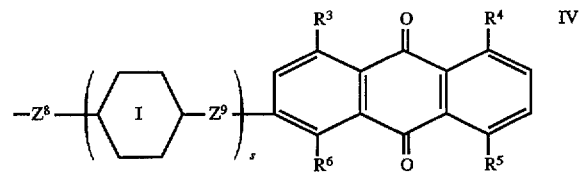

wherein ring I is pyridine-2,5-diyl, pyrimidine-2,5-diyl, trans-1,4-cyclohexylene, trans-1,3-dioxane-2,5-diyl, unsubstituted 1,4-phenylene, or 1,4-phenylene which is substituted with at least one substituent selected from the group consisting of halogen, methyl, and cyano;

$Z^8$ is —CH₂CH₂—, —CH₂O—, —COO—, —OOC—, —(CH₂)₄—, —(CH₂)₃O—, —COO(CH₂)$_p$—, or —COO(CH₂)$_p$O—;

$Z^9$ is a single bond, —COO(CH₂)$_p$N(CH₃)—, —COO(CH₂)$_p$NH—, —CH₂O—, —OCH₂—, —COO—, —OOC— or —NH—;

s is 0 or 1;

p is a whole number from 1 to 16 inclusive; and $R^3, R^4, R^5$ and $R^6$ each independently is hydrogen, halogen, cyano, —CH=CHNO₂, —CH=CHCN, —CH=C(CN)₂, nitro, hydroxy, a dialkylamino group, a cyclobutylamino group, an alkyl group, an alkoxy group, an alkanoyloxy group, an alkyl group which is substituted with at least one substituent selected from the group consisting of methyl, methoxy, cyano, and halogen, an alkoxy group which is substituted with at least one substituent selected from the group consisting of methyl, methoxy, cyano, and halogen, or an alkanoyloxy group which is substituted with at least one substituent selected from the group consisting of methyl, methoxy, cyano, and halogen.

8. The compound according to claim 2, wherein $A^3$ is a group of the formula

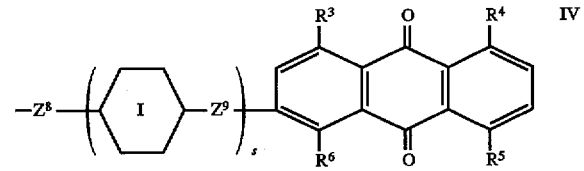

wherein ring I is pyridine-2,5-diyl, pyrimidine-2,5-diyl, trans-1,4-cyclohexylene, trans-1,3-dioxane-2,5-diyl, unsubstituted 1,4-phenylene, or 1,4-phenylene which is substituted with at least one substituent selected from the group consisting of halogen, methyl, and cyano; p1 $Z^8$ is —CH₂CH₂—, —CH₂O—, —COO—, —OOC—, —(CH₂)₄—, —(CH₂)₃O—, —COO(CH₂)$_p$—, or —COO(CH₂)$_p$O—;

$Z^9$ is a single bond, —COO(CH₂)$_p$N(CH₃)—, —COO(CH₂)$_p$NH—, —CH₂O—, —OCH₂—, —COO—, —OOC— or —NH—;

s is 0 or 1;

p is a whole number from 1 to 16 inclusive; and $R^3, R^4, R^5$ and $R^6$ each independently is hydrogen, halogen, cyano, —CH=CHNO₂, —CH=CHCN, —CH=C(CN)₂, nitro, hydroxy, a dialkylamino group, a cyclobutylamino group, an alkyl group, an alkoxy group, an alkanoyloxy group, an alkyl group which is substituted with at least one substituent selected from the group consisting of methyl, methoxy, cyano, and halogen, an alkoxy group which is substituted with at least one substituent selected from the group consisting of methyl, methoxy, cyano, and halogen, or an alkanoy-

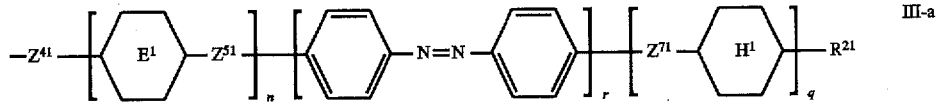

loxy group which is substituted with at least one substituent selected from the group consisting of methyl, methoxy, cyano, and halogen.

9. The compound according to claim 5, wherein $A^1$ and $A^2$ each independently is a group of the formula

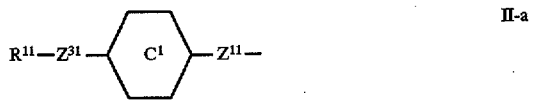

wherein ring $C^1$ is phenylene or phenylene which is substituted with fluorine;

$Z^{11}$ is —$CH_2CH_2$—, —$CH_2O$—, —COO—, —OOC—, —$(CH_2)_4$—, or —$(CH_2)_3O$—;

$Z^{31}$ is —$(CH_2)_{m'}$—, —$(CH_2)_{m'}O$—, —$(CH_2)_{m'}COO$—, or —$(CH_2)_{m'}OOC$—;

m' is a whole number from 4 to 12 inclusive; and $R^{11}$ is acrylate, methacrylate, vinyl ether, or epoxy.

10. The compound according to claim 7, wherein $A^1$ and $A^2$ each independently is a group of the formula

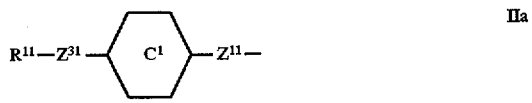

wherein ring $C^1$ is phenylene or phenylene which is substituted with fluorine;

$Z^{11}$ is —$CH_2CH_2$—, —$CH_2O$—, —COO—, —OOC—, —$(CH_2)_4$—, or —$(CH_2)_3O$—;

$Z^{31}$ is —$(CH_2)_{m'}$—, —$(CH_2)_{m'}O$—, —$(CH_2)_{m'}COO$—, or —$(CH_2)_{m'}OOC$—;

m' is a whole number from 4 to 12 inclusive; and $R^{11}$ is acrylate, methacrylate, vinyl ether, or epoxy.

11. The compound according to claim 1, wherein $A^3$ is a group of the formula

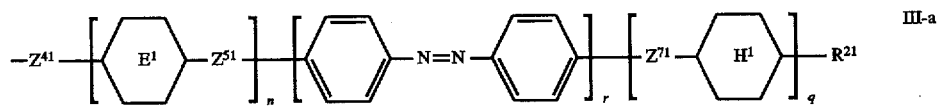

wherein rings $E^1$ and $H^1$ each independently is 1,4-phenylene or 1,4-phenylene which is substituted with fluorine;

$Z^{41}$ is —$COO(CH_2)_{p'}$— or —$COO(CH_2)_{p'}O$—;

$Z^{51}$ and $Z^{71}$ each independently is a single bond, —$CH_2CH_2$—, —$CH_2O$—, —COO—, or —OOC—;

n, q each independently is 0 or 1;

r is 1;

p' is a whole number from 4 to 12 inclusive; and $R^{21}$ is nitro or dimethylamino.

12. The compound according to claim 2, wherein $A^3$ is a group of the formula

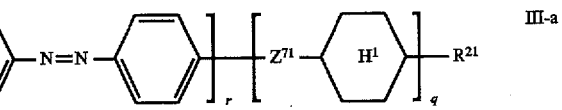

wherein rings $E^1$ and $H^1$ each independently is 1,4-phenylene or 1,4-phenylene which is substituted with fluorine;

$Z^{41}$ is —$COO(CH_2)_{p'}$— or —$COO(CH_2)_{p'}O$—;

$Z^{51}$ and $Z^{71}$ each independently is a single bond, —$CH_2CH_2$—, —$CH_2O$—, —COO—, or —OOC—;

n, q each independently is 0 or 1;

r is 1;

p' is a whole number from 4 to 12 inclusive; and $R^{21}$ is nitro or dimethylamino.

13. The compound according to claim 1, wherein $A^3$ is a group of the formula

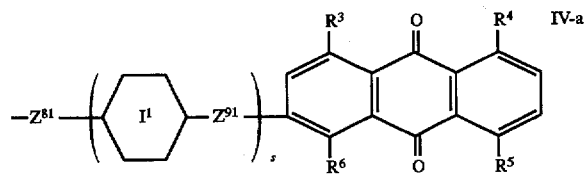

wherein ring $I^1$ is phenylene, phenylene which is substituted with fluorine, or trans-1,4-cyclohexylene;

$Z^{81}$ is —$COO(CH_2)_{p'}$— or —$COO(CH_2)_{p'}O$—;

p' os a whole number from 4 to 12 inclusive;

$Z^{91}$ is a single bond, —$COO(CH_2)_pN(CH_3)$—, or —COO$(CH_2)_pNH$—;

s is 0 or 1;

p is a whole number from 1 to 16 inclusive; and $R^3, R^4, R^5$, and $R^6$ each independently is hydrogen, halogen, cyano, —CH=CHNO$_2$, —CH=CHCN, —CH=C(CN)$_2$, nitro, hydroxy, a dialkylamino group, cyclobutylamino group, an alkyl group, an alkoxy group, an alkanoyloxy group, an alkyl group which is substituted with at least one substituent selected from the group consisting of methyl, methoxy, cyano, and halogen, an alkoxy group which is substituted with at least one substituent selected from the group consisting of methyl, methoxy, cyano, and halogen, or an alkanoyloxy group which is substituted with at least one substituent selected from the group consisting of methyl, methoxy, cyano, and halogen.

14. The compound according to claim 2, wherein $A^3$ is a group of the formula

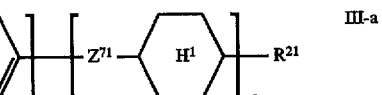

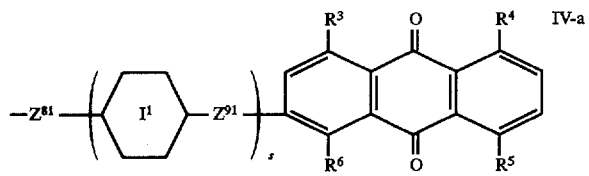

wherein ring $I^1$ is phenylene, phenylene which is substituted with fluorine, or trans-1,4-cyclohexylene;

$Z^{81}$ is —COO(CH$_2$)$_{p'}$— or —COO(CH$_2$)$_{p'}$O—;

p' is a whole number from 4 to 12 inclusive;

$Z^{91}$ is a single bond, —COO(CH$_2$)$_p$N(CH$_3$)—, or —COO(CH$_2$)$_p$NH—;

s is 0 or 1;

p is a whole number from 1 to 16 inclusive; and $R^3, R^4, R^5$, and $R^6$ each independently is hydrogen, halogen, cyano, —CH=CHNO$_2$, —CH=CHCN, —CH=C(CN)$_2$, nitro, hydroxy, a dialkylamino group, cyclobutylamino group, an alkyl group, an alkoxy group, an alkanoyloxy group, an alkyl group which is substituted with at least one substituent selected from the group consisting of methyl, methoxy, cyano, and halogen, an alkoxy group which is substituted with at least one substituent selected from the group consisting of methyl, methoxy, cyano, and halogen, or an alkanoyloxy group which is substituted with at least one substituent selected from the group consisting of methyl, methoxy, cyano, and halogen.

15. A compound of the formula

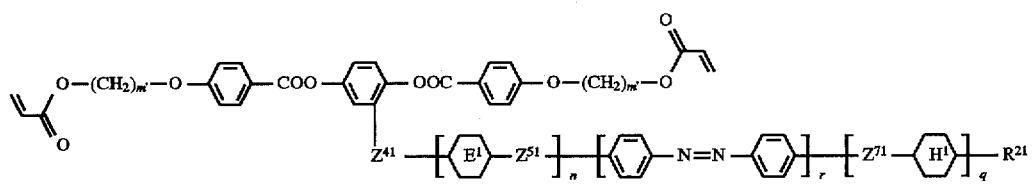

wherein m' is a number from 4 to 12 inclusive;

rings $E^1$ and $H^1$ each independently is 1,4-phenylene or 1,4-phenylene which is substituted with fluorine;

$Z^{41}$ is —COO(CH$_2$)$_{p'}$— or —COO(CH$_2$)$_{p'}$O—;

$Z^{51}$ and $Z^{71}$ each independently is a single bond, —CH$_2$CH$_2$—, —CH$_2$O—, —COO—, or —OOC—;

n and q each independently is 0 or 1;

r is 1; and $R^{21}$ is nitro.

16. The compound according to claim 15, wherein q is 0.

17. A cross-linkable, liquid crystalline mixture comprising at least 2 components, at least one of which is a compound of the formula

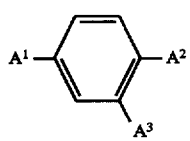

wherein $A^1$ and $A^2$ each independently is a cross-linkable, mesogenic group; and $A^3$ is a dichroic group.

18. The cross-linkable, liquid crystalline mixture according to claim 17, wherein the mixture comprises at least one compound selected from the group consisting of the formulas

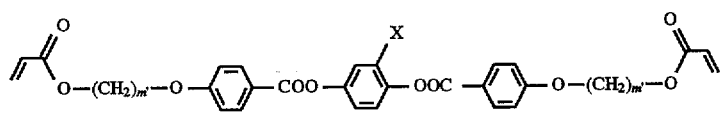 V
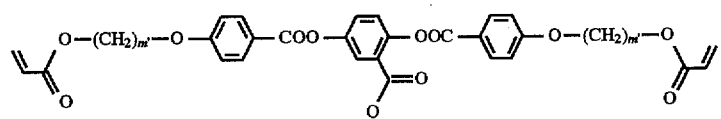 VI
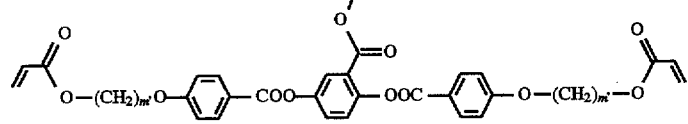 VII
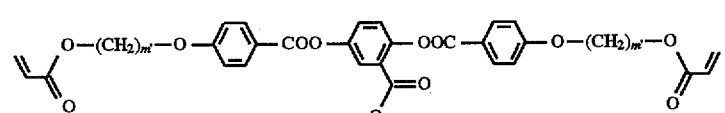 VIII
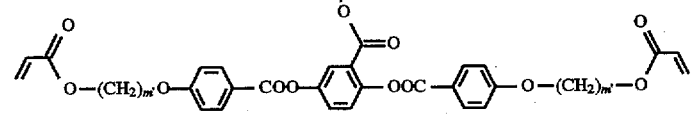 IX
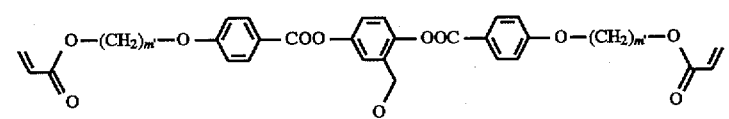 X -continued
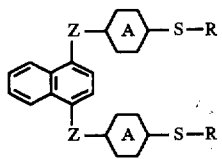
and
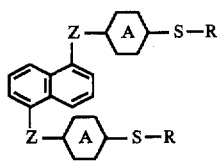
wherein
X is hydrogen, fluorine, chlorine, bromine, or methyl;
m' is a whole number from 4 to 12 inclusive;
t is a whole number from 2 to 12 inclusive;
Z is —OCH$_2$— or —OOC—;
XI
XII
A is 1,4-phenylene, 2-fluoro-1,4-phenylene, or 3-fluoro-1,4-phenylene;
S is —(CH$_2$)$_{m'}$— or —(CH$_2$)$_{m'}$O—; and
R is acrylate, methacrylate, vinyl ether, or epoxy.
* * * * *